United States Patent [19]

Oono et al.

[11] 4,340,894

[45] Jul. 20, 1982

[54] LASER BEAM RECORDING SYSTEM

[75] Inventors: Hiroshi Oono; Masahiro Ohnishi, both of Asaka, Japan

[73] Assignee: Fuji Photo Film Co., Ltd., Minami-ashigara, Japan

[21] Appl. No.: 168,786

[22] Filed: Jul. 14, 1980

[30] Foreign Application Priority Data

Jul. 13, 1979 [JP] Japan .................................. 54-89014

[51] Int. Cl.$^3$ .......................................... G01D 15/14
[52] U.S. Cl. ..................................... 346/108; 358/302
[58] Field of Search ................ 346/108, 76 L; 354/4, 354/5, 7; 358/297, 302

[56] References Cited

U.S. PATENT DOCUMENTS

| | | | |
|---|---|---|---|
| 4,040,737 | 8/1977 | Masaki et al. ..................... | 346/108 X |
| 4,044,363 | 8/1977 | Morgan ................................. | 354/5 |
| 4,109,256 | 8/1978 | Ohnishi ............................. | 346/108 X |
| 4,125,842 | 11/1978 | Ohnishi et al. ................. | 358/297 X |

Primary Examiner—Joseph W. Hartary
Assistant Examiner—W. J. Brady
Attorney, Agent, or Firm—Fleit & Jacobson

[57] ABSTRACT

In a laser beam recording system in which a laser beam is modulated by an acousto-optic modulator and the zero-order diffraction light beam is used to scan a recording material two-dimensionally for recording information, the zero-order diffraction light beam is vertically deflected to a light shielding mask located outside the recording area in the non-recording period. Thus, the horizontal scanning line is moved to the light shielding mask during the non-recording period and the recording material is prevented from being exposed to the attenuated zero-order diffraction light beam.

4 Claims, 6 Drawing Figures

LASER BEAM RECORDING SYSTEM

BACKGROUND OF THE INVENTION

1. Field of the Invention

This invention relates to a laser beam recording system, and more particularly to a laser beam recording system using a laser beam scanning means in which a laser beam is modulated by an acousto-optic modulator and the zero-order diffraction light beam is used for scanning a recording material two-dimensionally.

2. Description of the Prior Art

As a recording system for recording information on microfilm, there has been known a computer output microfilmer (COM) in which the output information of a computer is recorded on a microfilm together with fixed information such as frame lines given by a form slide. The conventional COM device has generally been of the type in which the output data from the computer is once displayed on a CRT and the light image on the CRT is focused on a photosensitive microfilm through a focusing lens.

On the other hand, accompanying the progress of the laser beam scanning system providing a stable and economical laser beam recording device, there has been put into practical use a laser COM device in which a laser beam is modulated by an acousto-optic modulator and caused to two-dimensionally scan a microfilm. Since the laser COM device uses a laser beam for recording information directly on a microfilm and the laser beam has an extremely high intensity and energy, the laser COM device is able to use a microfilm having a very low sensitivity such as a heat-mode recording material like a metal thin film.

Therefore, the laser COM device is advantageous in that the wet developing process can be eliminated, which process has been necessitated in the conventional COM device using a photosensitive microfilm of silver halide type. When using a heat-mode recording material like a metal thin film, it is desirable to use the zero-order diffraction light beam of an acousto-optic modulator because of its high peak energy.

However, the zero-order diffraction light beam obtained through an acousto-optic modulator involves a problem that the intensity thereof is not made completely zero when the output level is turned to zero. In other words, the zero-order diffraction light beam has a turned ON level "1" and a turned OFF level "0" being modulated by the acousto-optic modulator. Since the intensity of the zero-order diffraction light beam is very high, the intensity thereof cannot be made completely zero even when it is turned OFF. Thus, the attenuated zero-order light beam cannot be made completely zero.

On the other hand, in the laser COM device, the laser beam scans the recording material primarily in the horizontal direction and secondarily in the vertical direction. While the laser COM device is in the non-recording state in which the zero-order diffraction light beam is turned OFF, the zero-order laser beam horizontally scans the same position repeatedly without vertically deflected. The non-recording state referred to here means the state where the film is fed from one frame to another and the laser beam is turned OFF to stop recording information. In the non-recording state in the conventional laser COM, there is a problem that the recording material is exposed to the horizontally repeatedly scanning attenuated zero-order diffraction light beam and unnecessary recording of non-information linear pattern appears on the recording material. This unnecessary recording will hereinbelow be referred to as "fog".

In order to obtain a clear microimage on the microfilm, the fog must be eliminated. It is possible to eliminate the fog by using a laser beam which is modulated by a current type modulator and stopping the laser oscillation itself during the non-recording state, or by using a shutter in the optical path of the laser beam to completely close the optical path thereof during the non-recording state. In the former case, however, the output power of the current modulated laser beam is not stable. Further, the current modulating type laser beam scanning system does not have a long life. In the latter case, the shutter must be controlled at a very high speed. In practice, it is very difficult to operate such a shutter at such a high speed and response. The electrically controllable high speed shutter has a very sophisticated structure and considerably costly.

SUMMARY OF THE INVENTION

The primary object of the present invention, therefore, is to provide a laser beam recording system in which the fog is eliminated by a simple structural means.

A more specific object of the present invention is to provide a laser beam recording system for recording the output of a computer on a microfilm of comparatively low sensitivity in which the modulated laser beam is deflected out of the recording area of the microfilm during the non-recording state where the microfilm is fed from one frame to another or is in the stand-by position.

The present invention is characterized in that, in a laser beam recording system in which a laser beam is caused to scan a recording material like a microfilm from one frame to another, the laser beam is deflected vertically to a light shielding mask provided outside the recording area of the recording material and is caused to horizontally scan on the mask during the non-recording state of the recording system.

DESCRIPTION OF THE PREFERRED EMBODIMENTS

Now the present invention will be described in detail with reference to particular embodiment thereof referring to the accompanying drawings as briefly described above.

Figure 1:
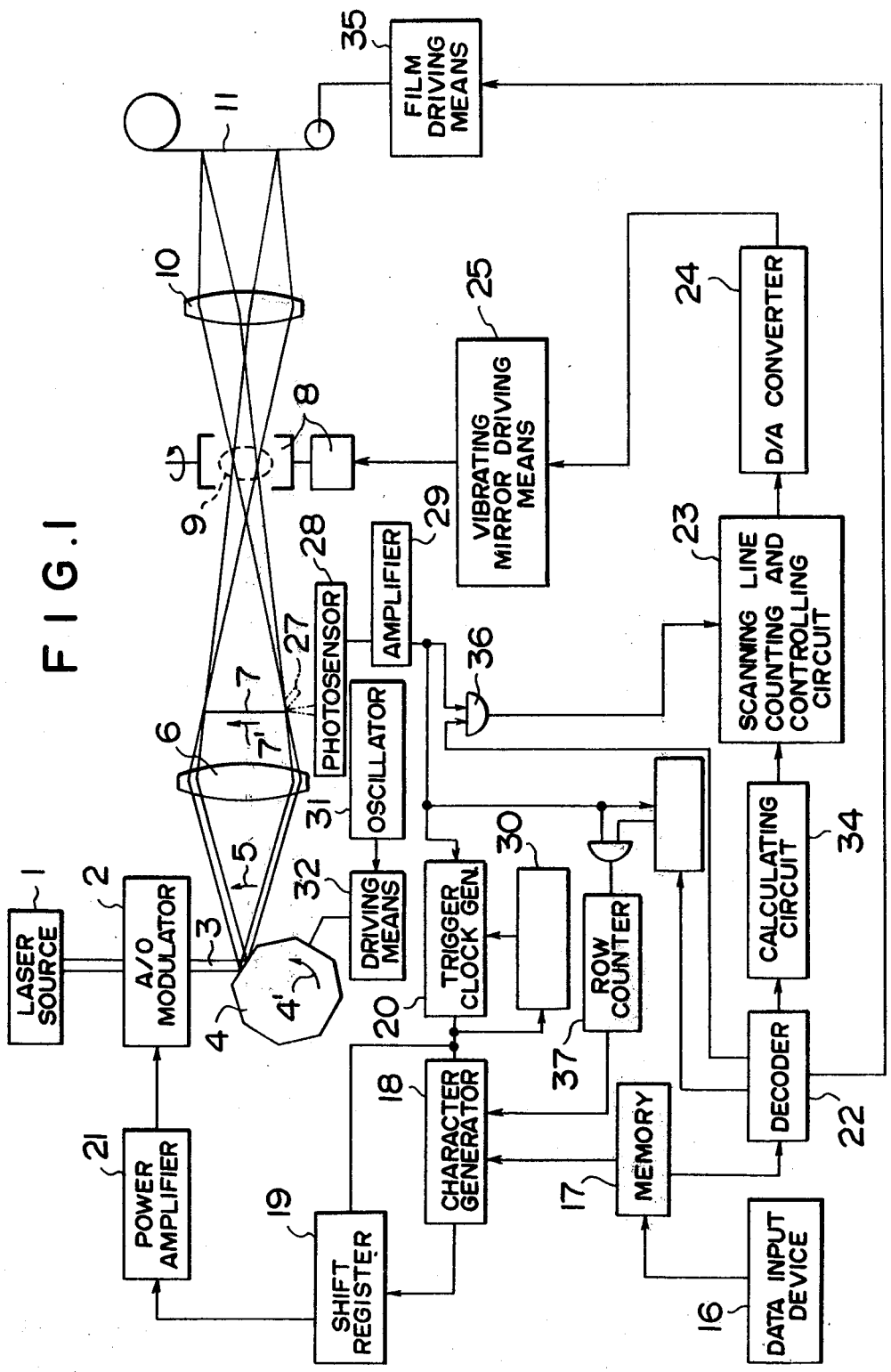
FIG. 1 is a block diagram of the laser COM device to which the present invention is applied.

Referring to FIG. 1, an optical system and an electrical system of a laser COM device to which a preferred embodiment of the present invention is applicable are shown.

The optical system will first be described in detail. A laser source 1 emits a laser beam which is amplitude modulated by an acousto-optic modulator 2. The modulated laser beam 3 is one-dimensionally deflected in the direction of arrow 5 by a rotating polygonal mirror 4 rotating in the direction of arrow 4′. Thus, the laser beam 3 is horizontally deflected to perform horizontal scanning. The deflected laser beam is focused by a scanning focusing lens 6 and forms a scanning line 7 along which the focused light spot scans in the direction of arrow 7′. The laser beam once focused is further deflected by a vertical deflecting mirror 8 which is of a vibrating type like a galvanometer. Thus, the laser beam is deflected in the direction perpendicular to the direction of the scanning line 7. Then, the vertically deflected laser beam is focused on a recording material 11 in the form of a minute light spot and scans the recording material two-dimensionally.

The rotating polygonal mirror 4 is rotated by an oscillator 31 and a driving means 32 connected therewith.

Now the electrical system will be described in detail. A data input device 16 consisting of a computer or a magnetic tape unit gives an output to a memory means 17 to be memorized therein, one frame of a microfilm at a time. The output data of the data input device 16 for one frame of the microfilm are thus memorized once in the memory means 17. The data include an image signal and a command signal. The image signal is sent to a character generator 18 and is then converted to a sequential image signal by a shift register 19 controlled by a trigger clock generator 20. The image signal is amplitude-modulated by a high frequency modulator and power-amplified by an amplifier 21, and is then applied to said acousto-optic modulator 2. Thus, the laser beam is sequentially modulated by the modulator 2 and records the image on the recording material 11 by two-dimensionally scanning the material 11.

Said command signal is decoded by a decoder 22 and sent to the vertical deflecting mirror 8 to control the same by way of a calculating circuit 34, a scanning line counting and controlling circuit 23, a D/A converter 24 and a vibrating mirror driving means 25. Further, the decoded signal from the decoder 22 is sent to a film driving means 35 for feeding the film or the recording material 11.

The synchronization between scanning lines on the recording material is made as follows. A fixed mirror 27 of a knife edge shape is provided in the vicinity of the starting point of the scanning line 7 to reflect the laser beam to a photosensor 28 when the laser beam impinges upon the mirror 27 at the time of every start of the scanning conducted by the rotating polygonal mirror 4. Every start of the horizontal scanning by the polygonal mirror 4 sensed by the mirror 27 is converted to an electric signal by the photosensor 28, and the output of the photosensor 28 is amplified by an amplifier 29 to give a synchronizing signal for every facet of the polygonal mirror 4. By the end of every synchronizing signal or fall of the synchronizing signal pulse, a trigger clock oscillator 20 is triggered to provide high frequency oscillation and give clock signals. The oscillated pulses are counted by a clock counter 30 and the oscillation of the trigger clock oscillator 20 is stopped when a predetermined number of pulses are counted. The predetermined number of pulses corresponds to the number of dots forming one scanning line, e.g. 10 dots (for one character)×132 characters (for one line)=1320 dots. Thus, the starting points of the scanning lines are aligned on the recording material regardless of the fluctuation in the rotating speed of the polygonal mirror or errors in the angle of the facets of the polygonal mirror. Further, said synchronizing signal pulses from the amplifier 29 are inputed into said scanning line counting and controlling circuit 23 together with a decoded signal from the decoder 22 by way of an AND gate 36 to give advancing pulses to the circuit 23 and to form a stepwise waveform through the D/A converter 24. The stepwise waveform signal is input into the vertical deflecting mirror driving means 25 to actuate the vertical deflector at a constant speed.

Figure 2A:
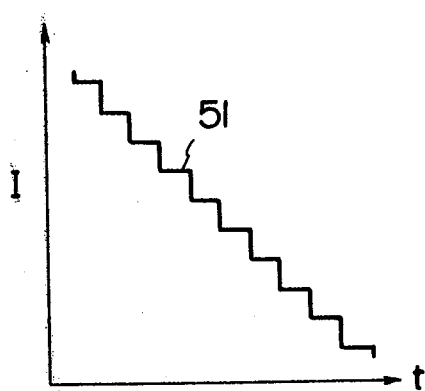
FIG. 2A is a graph showing a stepwise waveform of a signal inputed into a deflecting mirror of the laser beam scanning system.
Figure 2B:
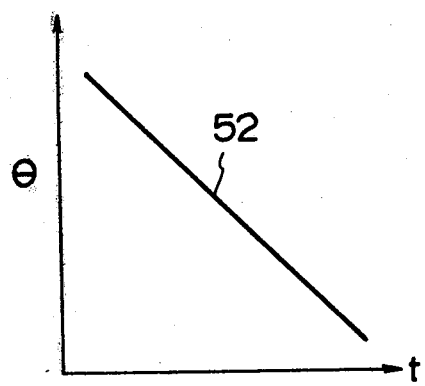
FIG. 2B is a graph showing the angle of the light deflecting mirror driven by the stepwise waveformed signal.
Figure 2C:
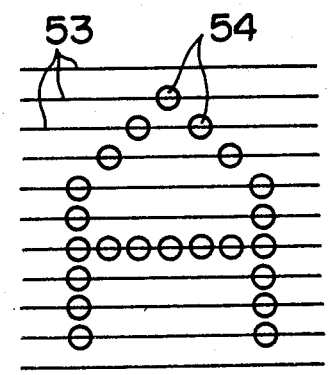
FIG. 2C is a front view showing an example of a character recorded by the laser beam recording system of this invention.

Now the structure of the image of the microfilm recorded by the above described laser beam recording system will be described with reference to FIGS. 2A, 2B and 2C. FIG. 2A shows the waveform of the stepwise signal inputed into the vibrating mirror driving means 25, in which the abscissa represents time (t) and the ordinate represents the value of current (I) both in relative scale. The stepwise formed signal 51 shows that the current level is stepwisely decreased as the time goes. FIG. 2B shows the angle of the vertically deflecting vibrating mirror 8 driven by the driving means 25. As shown in FIG. 2B in which the abscissa represents time (t) and the ordinate represents the angle ($\theta$) of the mirror 8, the straight line 52 indicates that the mirror 8 rotates smoothly at a constant speed by means of the stepwise current 51. Therefore, if an image signal is given to the modulator 2 when a predetermined time has passed since the synchronizing signal is given in each scanning line, an image of undeformed shape can be obtained as shown in FIG. 2C. FIG. 2C shows an example of a character "A" recorded on the recording material 11 by the above system. On the scanning lines 53 parallel to each other and spaced at equal intervals, a number of dots 54 are recorded in the arrangement to indicate the character "A". The scanning lines 53 are illustrated in FIG. 2C for the purpose of indicating the positions of the dots 54 only, and are not visible on the actual recording material 11.

When the laser COM device as described above is in the non-recording state, the vertical scanning of the laser beam is stopped. The vertical scanning is divided into two modes, i.e a constant speed scanning period (recording state) and a scanning stopped period (non-recording state). The scanning stopped period or the non-recording state is provided when the film is fed from one frame to another after recording of one frame or when the vertical scanning is stopped by the command of stopping the vertical scanning while the laser beam is scanning the recording material for recording information in one frame. In the non-recording state, the zero-order diffraction light beam is turned OFF and the attenuated light beam repeatedly scans the recording material 11 in the horizontal direction only. By the repeated horizontal scanning, the recording material is exposed to the attenuated light and even if the recording material is a heat-mode recording material it is fogged.

Therefore, in the laser COM device in which the present invention is embodied, a light shielding mask 40 (FIG. 4) is provided to prevent the laser beam from impinging upon the recording material 11 in the non-recording state.

Figure 3:
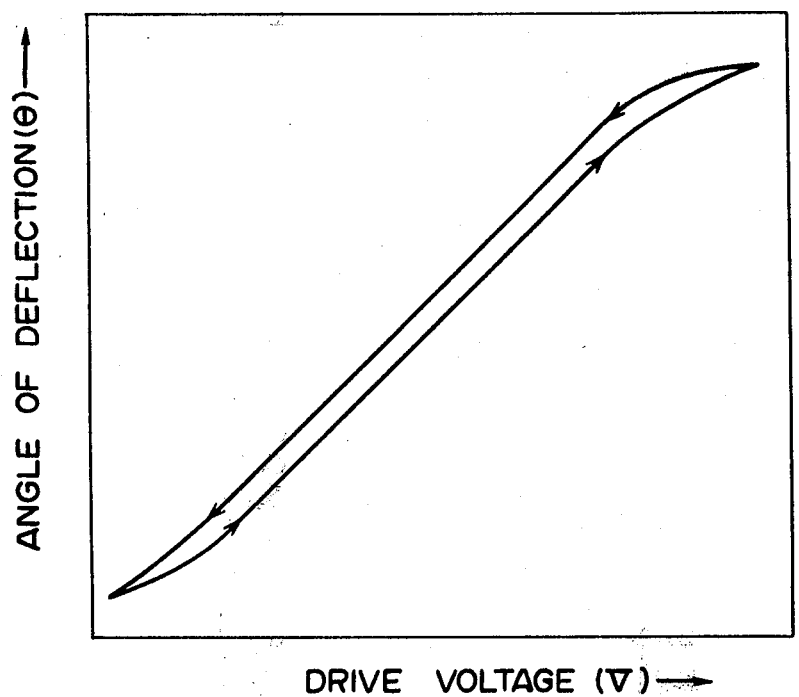
FIG. 3 is a graph showing the hysteresis of a vertically deflecting mirror used in a laser beam recording system.
Figure 4:
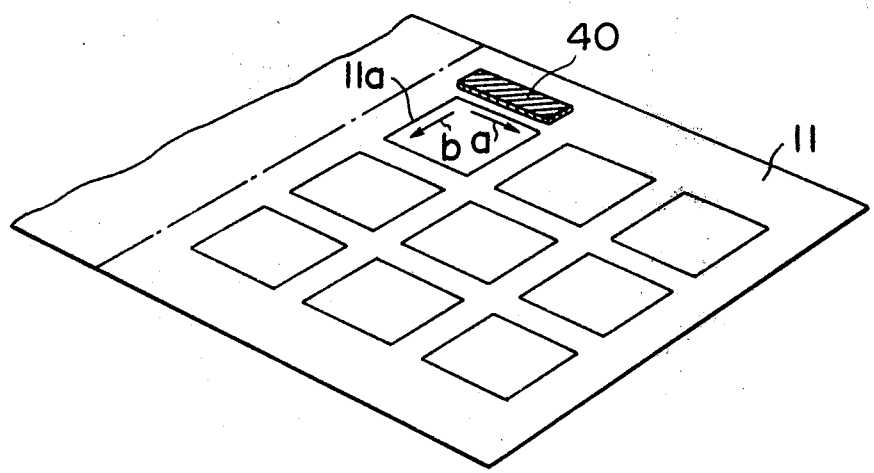
FIG. 4 is a partial perspective view showing the relative position of the light shield mask on a recording material like a microfilm.

Referring to FIG. 4, the recording material 11 like a microfilm has a number of recording areas 11a in which the information is to be recorded. The laser beam scans the recording material 11 in the recording areas 11a horizontally in the direction indicated by arrow a and vertically in the direction indicated by arrow b. In the present invention, a light shielding mask 40 is provided above the first scanning line in one frame or below the last scanning line in one frame, and the laser beam is deflected onto the light shielding mask 40 in the non-recording state. When the light shielding mask 40 is provided below the last scanning line in one frame, there is a defect as follows. Referring to FIG. 3, the vertical scanning mirror 8 has a hysteresis as shown in the graph of FIG. 3 by which the mirror 8 does not come to the same position when it is once moved to the light shielding mask 40 below the frame on the scanning path of one frame and then returned to the position on the path. Therefore, when the scanning laser beam is skipped to the mask 40 located below the frame, it is impossible to return the laser beam back to the original position on the scanning path unless the laser beam is once moved back to the upper starting position of the frame. Accordingly, in view of this, it is desirable to provide the light shielding mask 40 above the frame so that the laser beam always comes from an upper position after the vertical scanning is stopped.

Now the control of the vertical scanning mirror 8 in the non-recording state will be described in detail with reference to FIG. 1. In the case of the non-recording state, the command signal for the vertical scanning as decoded by the command decoder 22 indicates a command to stop the vertical scanning. Accordingly, the scanning line counting and controlling circuit 23 is provided with a signal through the calculating circuit 34 representing the vertical scanning starting position (on the light shielding mask 40 above the first horizontal scanning line in one frame). Then, the AND gate 36 is closed to prevent the advancing pulses from the amplifier 29 from passing therethrough so as to stop the advance of the circuit 23. Thus, the laser beam goes back to the vertical scanning starting position on the light shielding mask 40 and does not scan vertically, remaining on the mask 40. Since the laser beam is scanning on the light shielding mask 40, the recording material 11 is not exposed to the laser beam and accordingly there is no fear of forming fog thereon.

Then, when the vertical scanning is to be started again, a vertical scanning starting signal (signal which indicates the designated position) is inputed into the circuit 23 from the decoder 22 by way of the calculating circuit 34. Then, the AND gate 36 is opened to pass the advancing pulses from the amplifier 29 to the circuit 23. At this stage, the deformation of the recorded image can be prevented by providing a particular scanning line as disclosed in Japanese Unexamined Patent Publication No. 53(1978)-124908.

When the recording of information on one frame 11a is finished, the scanning line counting and controlling circuit 23 is provided with a vertical scanning starting position signal through the calculating circuit 34, and the AND gate 36 is closed to stop the advancing pulses from the amplifier 29. Thus, the advance of the circuit 23 is stopped. While the film or the recording material 11 is fed from one frame to another, this condition is maintained. When the film 11 has been fed to the next frame, the AND gate 36 is opened and the advancing pulses from the amplifier 29 is passed therethrough, and the scanning line counting and controlling circuit 23 is advanced to perform the recording of information for the next frame 11a.

When the laser beam is scanning on the light shielding mask 40, the laser beam does not impinge upon the recording material 11. Then, when a predetermined number of advancing pulses are counted and the laser beam is vertically scanned by that number of advancing pulses, e.g. 30 counts, the laser beam comes out of the mask 40. At this time, the image signal is given to the acousto-optic modulator 2 to start modulation for recording information.

In FIG. 1, the reference numeral 37 designates a row counter.

We claim:

1. In a laser beam recording system having a recording state and a non-recording state, and wherein a laser beam is modulated by an acousto-optic modulator and a zero-order diffraction light beam is deflected horizontally in accordance with primary scanning and vertically in accordance with secondary scanning so as to two-dimensionally scan a recording material to record information thereon in recording areas thereof, the improvement comprising command means for issuing commands including a stop command to stop vertical scanning, further means for providing a vertical scanning starting position signal, a light shielding mask provided outside said recording area above the recording material, and control means responsive to said stop command and to said vertical scanning starting position signal for deflecting the laser beam out of the recording area onto a vertical scanning starting position on said light shielding mask in the non-recording state of the recording system.

2. In a laser beam recording system as defined in claim 1, wherein said light shielding mask is located outside the uppermost horizontal scanning line of said recording area and has a length longer than the length of the scanning line.

3. In a laser beam recording system as defined in claim 1, further comprising advancing means for providing advancing pulses to said control means, said control means being responsive thereto in said recording state for scanning said recording material, and gate means connected between said advancing means and said control means and responsive to said stop command for blocking said advancing pulses from reaching said control means.

4. In a laser beam recording system as defined in claim 1, wherein said commands include a start command to start vertical scanning, said system further comprising advancing means for providing advancing pulses to said control means, said control means being responsive thereto in said recording state for scanning said recording material, and gate means connected between said advancing means and said control means and responsive to said start command for passing said advancing pulses to said control means.

* * * * *